United States Patent Office 3,331,731
Patented July 18, 1967

3,331,731
METHOD OF AND ARTICLE FORMED BY SEALING ALUMINA CERAMIC TO A METAL WITH A SEALANT GLASS
Nils Tryggve E. A. Bååk, Toledo, Ohio, assignor to Owens-Illinois, Inc., a corporation of Ohio
No Drawing. Filed Nov. 14, 1962, Ser. No. 237,727
5 Claims. (Cl. 161—196)

This invention relates to glass compositions having generally high moduli of rupture and having high shatter resistance. The invention also relates to seals between the said glasses and crystalline alumina refractories, and to methods for making same.

The use of ceramics as electron tube envelopes and as structural parts in other electronic devices requires methods for sealing ceramics to metals, glasses, and to other ceramics; a seal with low residual stresses is desirable, and strength, chemical durability, and shatter or shock resistance, as well as high electrical resistivity values are particularly valuable properties in glasses to be used to seal to such ceramics. High purity, high density, alpha-alumina is a particularly valuable electron tube material because of its high strength and balance of good electrical properties, but few satisfactory glasses have been found for sealing to this refractory. One reason is that many glasses will not even wet alumina sufficiently to form a good bond; other glasses have poor electrical properties, and, of course, many glasses do not have a suitable coefficient of expansion to sufficiently match that of alpha-alumina. Most glasses which will adhere and seal to alumina are relatively low softening glasses and are undesirable from this standpoint.

Accordingly, it is an object of the invention to provide high softening point glasses which will wet and seal to dense polycrystalline aggregated alumina ceramics.

Another object of the invention is to provide glasses having superior mechanical strength, toughness and shatter resistance, and chemical durability, as well as high electrical resistivity.

Another object of the invention is to prepare alpha-alumina articles sealed to said glass, and to provide a method for preparing such seals.

A still further object of the invention is to prepare alpha-alumina ceramic articles sealed to molybdenum, and to provide a method for preparing such seals.

Other objects, as well as aspects and advantages, of the invention will become apparent from a consideration of the specification.

In accordance with the invention there are provided glass compositions containing from 53 to 63 weight percent $SiO_2$, from 8 to 15 weight percent $Al_2O_3$, from 20 to 32 weight percent CaO, and from 5.5 to 9.5 weight percent $CaF_2$. The foregoing method of expressing the fluorine content is one conventional method and is not meant to imply that the fluorine is necessarily present in the form of calcium fluoride; nor is it meant to imply that the batch material for introducing the fluoride ion is necessarily calcium fluoride.

As stated, the glasses of the invention wet and strongly adhere to alumina, have high impact shatter resistance generally high moduli of rupture in the neighborhood of 20,000 lbs. per square inch and up. The glasses of the invention consisting essentially of the foregoing components in the foregoing percentages also have annealing points at least as high as 600° C., and volume resistivities of at least $10^{13}$ ohm-cm. at 250° C. The annealing point is the temperature at which the viscosity of the glass is $10^{13}$ poises. The glasses of the invention are compatible with ceramics and other materials having coefficients of expansion in the range from about 50 to about $80 \times 10^{-7}$.

Glasses of the invention consisting essentially of 54–60 weight percent silica, 12–14 weight percent alumina, 20–24 weight percent calcium oxide, and 5.5–9.5 weight percent calcium fluoride have an especially desirable balance of properties.

The glasses can be prepared by common glass-forming procedures; however, whether the fluoride ion is introduced in the form of calcium fluoride, aluminum fluoride, or otherwise, it must be understood that some fluorine loss is usually to be anticipated in the preparation of the glasses. Such fluorine loss can be minimized, if desired, by known procedures. For instance, use of completely dry starting materials will minimize the loss. Also, avoiding use of starting materials which decompose to give volatile products, such as calcium carbonate, will minimize the losses. It is also helpful to prepare a melt of the components not containing the fluoride ion and then to mix intimately the resulting glass in powder form with the fluoride ion containing component. Thus, for instance, calcium carbonate, alumina, and silica can be melted to a homogeneous glass, cooled and pulverized and then, under dry conditions, mixed with powdered calcium fluoride, and the mixture melted to prepare the final glass.

The melting of the glass batch can usually be carried out at temperatures ranging from about 1300° C. to about 1450° C.

Alpha-alumina parts, or parts made from other crystalline refractories, can be sealed to a structural part of one of the present glasses by preheating the alumina ceramic to the neighborhood of the softening point of the glass or higher, and heating the area of the glass part to be sealed until it is in a soft condition, and thereafter bringing the parts together, while continuing heating at the seal area until a good seal is formed. For sealing alpha-alumina, using the present glass as sealant, to another part made of a metal, glass, or ceramic, the preheated alpha-alumina can be dipped in the glass melt, or otherwise coated at the sealing area with the sealing glass in the molten condition, and thereafter the other preheated part brought together with the sealing glass while heating the seal area until a good bond is formed with both parts. In this manner, for instance, an alpha-alumina ceramic part is sealed to a molybdenum metal part using the glass of Example IV as the sealant.

The examples of the invention which follow are merely illustrative and are not to be considered as limiting the invention.

EXAMPLE I

The following components were combined in particulate form in the indicated proportions:

| | Parts by weight |
|---|---|
| $SiO_2$ | 47.6 |
| $Al_2O_3$ | 11.3 |
| $CaCO_3$ | 32.0 |
| $CaF_2$ | 9.1 |

These components were mixed in a ball mill for 45 minutes, and then heated at 1370° C. in a platinum crucible in an air atmosphere for about 7 hours and 45 minutes to prepare a homogeneous glass melt. At the end of this time a one-half inch outside diameter alpha-alumina tube was preheated to about 1000° C. and then dipped into the melt; the resultant seal was annealed from 700° C. to room temperature overnight. No cracks in the seal were evident, and the glass appeared stress-free under polarized light.

A sample of this melt was also cast into a 1.5-inch diameter sphere by means of a graphite mold. After casting, the mold and its contents were annealed from about 700° C. to room temperature overnight. The resultant glass sphere appeared stress-free under polarized light; it was dropped repeatedly from heights of 20 feet onto concrete without suffering damage beyond very minor chipping.

The sphere was later cut up into samples for testing electrical properties. The volume resistivity of the glass was about $10^{15.4}$ at 200° C., $10^{13.9}$ at 250° C., $10^{11}$ at 400° C. and $10^{9.4}$ at 500° C., all values being in ohm-centimeters.

Because of their good impact resistance, durability, and resistivity, the glasses of the invention are excellent materials for electrical insulators, especially line post insulators used outdoors and exposed to the atmosphere, hail, sandstorms and the like.

The glass was analyzed and found to be of the following composition, the fluorine being expressed as $CaF_2$:

| | Weight percent |
|---|---|
| $SiO_2$ | 56.60 |
| $Al_2O_3$ | 13.40 |
| CaO | 20.93 |
| $CaF_2$ | 9.07 |
| | 100.00 |

EXAMPLE II

Two other glasses were prepared in the manner described in Example I, but having the following compositions, by analysis:

*Glass A*

| | Weight percent |
|---|---|
| $SiO_2$ | 56.88 |
| $Al_2O_3$ | 13.28 |
| CaO | 22.03 |
| $CaF_2$ | 7.76 |
| | 99.95 |

*Glass B*

| | Weight percent |
|---|---|
| $SiO_2$ | 57.12 |
| $Al_2O_3$ | 13.33 |
| CaO | 22.60 |
| $CaF_2$ | 7.04 |
| | 100.09 |

Rods were pulled from melts of each glass and strength tests were made on rods abraded with emery paper. The rods from Glass A had an average modulus of rupture for four specimens of 19,500 p.s.i., while the average for rods from Glass B was 33,800 p.s.i.

EXAMPLE III

From another glass prepared in a manner similar to Example I was cast a sphere which was also stress-free and highly shatter resistant. The analysis of this glass in weight percent was 56.62 $SiO_2$, 13.40 $Al_2O_3$, 21.98 CaO and 8.00 $CaF_2$.

EXAMPLE IV

A glass having the composition

| | Weight percent |
|---|---|
| $SiO_2$ | 57.20 |
| $Al_2O_3$ | 13.43 |
| CaO | 23.12 |
| $CaF_2$ | 6.05 |
| | 99.80 | was prepared in a manner similar to Example I. Samples of the glass were tested for chemical durability to caustic attack, as follows: The glass was crushed and screened to obtain the −40, +50 fraction. This was washed with water, then with acetone, and then dried in an oven. Thereafter, one gram samples were placed in a 50 ml. platinum dish and covered with 25 ml. of 5% NaOH solution, after which the dish was covered with a platinum lid. The samples were then heated for six hours at 90° C. Thereafter, the remaining glass was separated from the solution and washed with distilled water and thoroughly dried. The weight loss of the glass was then determined and reported in milligrams. The weight loss was only 7 mg., as compared with 65 mg. for a standard laboratory ware borosilicate glass.

The glasses of the invention, because of their high durability in alkaline solution, are useful for the manufacture of glass electrodes for use at high pH values.

The coefficients of expansion and contraction for the glass of Example IV were also determined, as follows:

*Expansion*

| | |
|---|---|
| × $10^7$ (25–300° C.) | 65.5 |
| × $10^7$ (25–656° C.) | 77 |

*Contraction*

| | |
|---|---|
| × $10^7$ (25–300° C.) | 60 |
| × $10^7$ (25–656° C.) | 77 |

As will be evident to those skilled in the art, various modifications of this invention can be made or followed in the light of the foregoing disclosure and discussion without departing from the spirit and scope of the disclosure or from the scope of the claims.

I claim:

1. An article comprising an alumina ceramic part and a glass part, said glass part being sealed directly to said ceramic part, the glass consisting essentially of 53–63 weight percent $SiO_2$, 8–15 weight percent $Al_2O_3$, 20–32 weight percent CaO and 5.5–9.5 weight percent $CaF_2$.

2. A method of sealing an alumina ceramic part to a metal part having a coefficient of expansion compatible with the coefficient of expansion of said alumina part which comprises wetting at least one of said parts with a molten glass consisting essentially of 53–63 weight percent $SiO_2$, 8–15 weight percent $Al_2O_3$, 20–32 weight percent CaO, and 5.5–9.5 weight percent $CaF_2$, and bringing the parts together with the glass therebetween and heating the sealing area until a seal is formed with both parts, and thereafter cooling the composite article.

3. A method of claim 2 wherein said metal is molybdenum.

4. An article comprising an alumina ceramic part and a metal part sealed together with an interposed layer of a glass consisting essentially of 53–63 weight percent $SiO_2$, 8–15 weight percent $Al_2O_3$, 20–32 weight percent CaO, and 5.5–9.5 weight percent $CaF_2$.

5. An article comprising an alumina ceramic part and a metal part wherein said metal is molybdenum, said parts sealed together with an interposed layer of a glass consisting essentially of 53–63 weight percent $SiO_2$, 8 to 15 weight percent $Al_2O_3$, 20 to 32 weight percent CaO and 5.5 to 9.5 weight percent $CaF_2$.

References Cited

UNITED STATES PATENTS

| 1,159,785 | 2/1958 | Has et al. | 106—39 |
| 2,933,458 | 4/1960 | King et al. | 106—52 X |
| 3,023,492 | 3/1962 | Bristow | 65—43 X |

FOREIGN PATENTS

| 1,159,785 | 2/1958 | France. |

DONALL H. SYLVESTER, *Primary Examiner.*

A. D. KELLOGG, *Assistant Examiner.*